(12) United States Patent
Johnsson et al.

(10) Patent No.: US 11,510,068 B2
(45) Date of Patent: Nov. 22, 2022

(54) METHOD AND NETWORK AGENT FOR CELL ASSIGNMENT

(71) Applicant: Telefonaktiebolaget LM Ericsson (publ), Stockholm (SE)

(72) Inventors: Andreas Johnsson, Uppsala (SE); Ola Angelsmark, Ystad (SE); Mats Klingberg, Enebyberg (SE); Filip Oredsson, Malmö (SE); Rakesh Ranjan, Järfälla (SE); Johan Åman, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/734,627

(22) PCT Filed: Jun. 7, 2018

(86) PCT No.: PCT/EP2018/065095
§ 371 (c)(1),
(2) Date: Dec. 3, 2020

(87) PCT Pub. No.: WO2019/233589
PCT Pub. Date: Dec. 12, 2019

(65) Prior Publication Data
US 2021/0160700 A1 May 27, 2021

(51) Int. Cl.
*H04W 16/18* (2009.01)
*G06N 3/02* (2006.01)
(Continued)

(52) U.S. Cl.
CPC ............. *H04W 16/18* (2013.01); *G06N 3/02* (2013.01); *G06N 5/046* (2013.01); *H04W 24/02* (2013.01); *H04W 24/10* (2013.01); *H04W 84/18* (2013.01)

(58) Field of Classification Search
CPC .... G06N 3/02; H04W 36/0085; H04W 24/10; H04W 36/00837; H04W 36/22;
(Continued)

(56) References Cited

U.S. PATENT DOCUMENTS 9,332,471 B2 * 5/2016 Huang ............ H04W 36/00837
11,012,872 B1 * 5/2021 Bellamkonda ........... G06N 3/04
(Continued)

FOREIGN PATENT DOCUMENTS

CN 102638296 A * 8/2012
CN 102026211 B * 8/2014 ............ H04W 16/18
(Continued)

OTHER PUBLICATIONS

International Search Report and Written Opinion of the International Searching Authority for PCT International Application No. PCT/EP2018/065095 dated Oct. 12, 2018.
(Continued)

*Primary Examiner* — Matthew C Sams
(74) *Attorney, Agent, or Firm* — Sage Patent Group

(57) ABSTRACT

A method and a network agent for providing cell assignment for a wireless device served by a network node. An input vector is created for a set of candidate cells based on measurements by the wireless device and/or by the network node related to performance and signals. A future effect of assigning the wireless device to a candidate cell is estimated for each candidate cell by applying the created input vector to an effect estimation function which may be a Q-learning function. A cell in the set of candidate cells is then determined and assigned for the wireless device, based on the estimated future effects of the candidate cells. The cell that provides the best future effect may be selected for cell assignment.

22 Claims, 4 Drawing Sheets

(51) Int. Cl.
*H04W 24/02* (2009.01)
*H04W 24/10* (2009.01)
*H04W 84/18* (2009.01)
*G06N 5/04* (2006.01)

(58) Field of Classification Search
CPC .......... H04W 36/00835; H04W 24/02; H04W 16/18; H04W 36/0094
See application file for complete search history.

(56) References Cited

U.S. PATENT DOCUMENTS

| | | | | |
|---|---|---|---|---|
| 2015/0126192 | A1* | 5/2015 | Huang | H04W 36/00835 455/436 |
| 2018/0206133 | A1* | 7/2018 | Venkatraman | H04W 4/70 |
| 2018/0376390 | A1* | 12/2018 | Gemelos | H04W 36/0005 |
| 2019/0007873 | A1* | 1/2019 | Kumar | H04W 76/23 |
| 2020/0260427 | A1* | 8/2020 | Schefczik | H04W 72/0406 |
| 2020/0323038 | A1* | 10/2020 | Dahan | H04L 41/0886 |
| 2021/0160700 | A1* | 5/2021 | Johnsson | H04W 84/18 |

FOREIGN PATENT DOCUMENTS

| | | | | |
|---|---|---|---|---|
| CN | 107864478 | A * | 3/2018 | ............ H04W 16/18 |
| CN | 109391511 | A * | 2/2019 | |
| EP | 3783811 | A1 * | 2/2021 | ......... H04B 7/18513 |
| KR | 20190098043 | A * | 1/2019 | |
| WO | 2008031258 | A1 | 3/2008 | |
| WO | 2014198317 | A1 | 12/2014 | |

OTHER PUBLICATIONS

Krishnan et al, "HIRL: Hierarchical Inverse Reinforcement Learning for Long-Horizon Tasks with Delayed Rewards", arxiv.org, Cornell University Library, Apr. 22, 2016, pp. 1-12.

Krose, "Learning from delayed rewards", Guest Editorial, Robotics and Autonomous SYSTEMS,vol. 15, No. 4, Oct. 1, 1995, pp. 233-235.

Mnih et al, "Playing Atari with Deep Reinforcement Learning," arXiv:1312.5602v1, Dec. 19, 2013, pp. 1-9.

* cited by examiner

METHOD AND NETWORK AGENT FOR CELL ASSIGNMENT

CROSS REFERENCE TO RELATED APPLICATION

This application is a 35 U.S.C. § 371 national stage application of PCT International Application No. PCT/EP2018/065095 filed on Jun. 7, 2018, the disclosure and content of which is incorporated by reference herein in its entirety.

TECHNICAL FIELD

The present disclosure relates generally to a method and a network agent, for assigning a wireless device to a cell.

BACKGROUND

In this disclosure, the term "wireless device" is used to represent any communication entity capable of radio communication with a wireless network by sending and receiving radio signals, such as e.g. mobile telephones, tablets, laptop computers, Internet of Things, IoT, and Machine-to-Machine, M2M, devices also known as Machine Type Communication, MTC, devices, although this disclosure is not limited to these examples. Another common generic term in this field is "User Equipment, UE" which could be used herein as a synonym for wireless device. Depending on the terminology used, the wireless network mentioned herein may also be denoted a cellular network.

Further, the term "network node", is used to represent a node of a wireless network that is capable of communicating radio signals with wireless devices. Depending on the type of network, the network node in this disclosure may refer to a base station, eNB, gNB, radio node, Node B, base transceiver station, access point, etc., where gNB denotes a Next Generation NodeB. For example, the wireless network may be operating according to Long Term Evolution (LTE) or according to 5G, also referred to as "New Radio" (NR), as defined by the third Generation Partnership Project, 3GPP.

A wireless network of today, e.g. using LTE or NR technology, is built from base-stations, commonly called eNodeBs, that communicate directly with wireless devices over radio frequencies. An eNodeB can serve several "cells", where a cell can be seen as a radio resource that is defined by a radio carrier of a specific frequency range, i.e. bandwidth, providing radio coverage across a specific area. For LTE, the radio carrier bandwidth is typically between 1.4 MHz to 20 MHz depending on allocated spectrum and service needs, while NR can serve even wider bandwidths.

The radio spectrum used for radio communication in an area is divided into several non-overlapping frequency bands which are defined in the 3GPP specifications, and by local authorities. Such frequency bands have very different propagation properties. For example, a 900 MHz band can be used to cover a considerably larger area than a 2100 MHz band. The network operator is typically licensed to operate carriers in one or more of these bands, and may use multiple carriers within a single band.

Depending on the need for services, a network node serving a cell may be equipped with a single antenna or multiple antennas. Using 2, 4 or even more antennas allows for beamforming which basically directs transmitted energy towards a specific wireless device, and also multi-layer transmission using multiple distinct paths to a wireless device for transmission of data with increased throughput. This means that the throughput available from a cell to a wireless device is dependent on capabilities of the network node, e.g. number of antennas, carrier bandwidth, modulation capability, etc., as well as capabilities of the device and the propagation conditions between device and network node.

The device capabilities are commonly reported to a serving network node upon connection to a cell, and the network node then usually instructs the wireless device to measure signals received from the cell, and sometimes also from other cells referred to as neighboring cells, and to report the measuring results. This information can then be used by the network node to allocate resources to the UE. The capabilities that the wireless device reports typically contain, among other things, information about which frequency bands the wireless device can transmit and receive, what bandwidths it can handle, and how many antennas and layers it can handle. The latter capability is part of the so-called "UE class".

When a wireless device is attached to a network node, e.g. when being switched-on or after a prolonged period of sleep, the network node selects and assigns a suitable cell and network resources to the device based on the above-described capabilities and signal measurements. However, this assignment of cell and resources may not be optimal with respect to throughput and quality requirements in the device and resource usage in the network. Further, the assignment of cell is reactive and relatively static in the sense that it may be changed when the radio conditions and traffic in the cell change over time based on whether certain predefined and static rules and thresholds are met or not.

For example, a high-end mobile phone may get the best possible cell and other resources based on the conditions at the time of attachment although the conditions may later be changed allowing for a better cell assignment with higher throughput and/or service quality which thus may remain unutilized since the initial assignment may be kept unless some predefined rule or threshold is met. On the other hand, a simple Internet of Things, IoT, device with low requirements for throughput and/or quality may get a better cell and more resources than needed for operation of the IoT device just because the radio and traffic conditions happened to be favorable at the time of attachment. It is thus a problem that initial assignment of cell and resources to wireless devices as well as resource usage may turn out to be less than optimal, e.g. with respect to radio and traffic conditions in the cells as well as needs and requirements in the wireless devices.

SUMMARY

It is an object of embodiments described herein to address at least some of the problems and issues outlined above. It is possible to achieve this object and others by using a method and an agent as defined in the attached independent claims.

According to one aspect, a method is provided that may be performed by a network agent for providing cell assignment for a wireless device served by a network node in a wireless network. In this method, measurements made by at least one of the wireless device and the network node are obtained. Said measurements are related to network performance and to signals transmitted in one or more cells. An input vector for an effect estimation function for a set of candidate cells served by the network node, is then created based on the obtained measurements.

For each candidate cell, a future effect of assigning the wireless device to said candidate cell is further estimated by applying the created input vector to the effect estimation function. Then a cell in the set of candidate cells is determined to serve the wireless device, based on the estimated future effects of the candidate cells, which may be done by selecting the cell that provides the most favourable future effect. Finally, the wireless device is assigned to the determined cell for use in radio communication with the wireless device.

According to another aspect, a network agent is arranged to provide cell assignment for a wireless device served by a network node in a wireless network. The network agent is configured to obtain measurements, made by at least one of the wireless device and the network node, related to network performance and to signals transmitted in one or more cells. The network agent is also configured to create, for a set of candidate cells served by the network node, an input vector for an effect estimation function based on the obtained measurements.

The network agent is further configured to estimate, for each candidate cell, a future effect of assigning the wireless device to said candidate cell by applying the created input vector to the effect estimation function. The network agent is also configured to determine a cell in the set of candidate cells to serve the wireless device, based on the estimated future effects of the candidate cells, and to assign the wireless device to the determined cell for use in radio communication with the wireless device.

The above method and network agent may be configured and implemented according to different optional embodiments to accomplish further features and benefits, to be described below.

A computer program is also provided comprising instructions which, when executed on at least one computer in the above network agent, cause the at least one computer to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
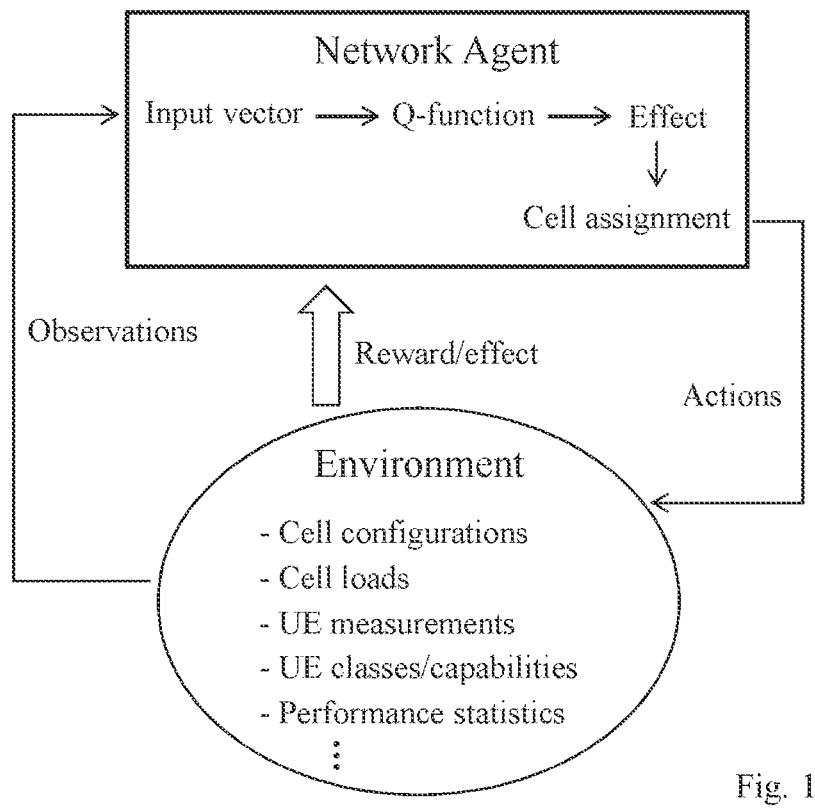
FIG. 1 is a communication scenario illustrating how a network agent may be used for applying a Q-learning function to achieve improved cell assignments for wireless devices, in accordance with some example embodiments.

Briefly described, a solution is provided which can be used to achieve an improved or even optimized cell assignment for a wireless device, by employing machine learning including applying an input vector related to a set of candidate cells to an "effect estimation function", which may be a Q-learning function, which thus estimates the effect of assigning the device to a candidate cell. The input vector basically reflects the current conditions in the network, or "environment", and contains values of various measured parameters related to performance in the network, such as throughput and quality as measured by the wireless device itself or by its serving network node.

Other performance related parameters may include average throughput, latency, traffic load and quality, which may be measured by multiple devices and/or by various network nodes in the network. The input vector may further contain information about the number of wireless devices attached to each cell, amount of pending data to be communicated with a device, and characteristics of each cell such as carrier frequency, cell size, geographic position, etc.

The outcome of using the effect estimation function for a set of candidate cells is an estimated future effect or "reward", of assigning either of the candidate cells to the wireless device. The effect estimation function may be applied for the candidate cells one by one in sequence or for all candidate cells at the same time as parallel operations, and the solution is not limited in this respect. The effect estimation function can then be updated based on a measured immediate effect after assigning one of the candidate cells, compared to the previously estimated future effect for that cell.

This way, the network can observe and learn how different cell assignments affect performance in the network, so as to maximize or at least improve the network performance over time by better cell assignments using the updated effect estimation function which will thus be gradually improved by providing increasingly accurate estimations. It is an advantage that predictive and "proactive" cell assignments can be made based on knowledge gained from earlier cell assignments, instead of relying on preset rules and thresholds for reactive cell assignment, since the effect estimation function can predict the future effect provided by each candidate cell. The "best" cell providing the most favourable future effect can thus be selected to serve the wireless device. Applying the above-described input vector to the effect estimation function can be regarded as a part of the procedure referred to as Reinforcement Learning, RL, which is a subarea of machine learning where a software agent takes actions in an environment to maximize (or at least find a local maximum) a cumulative reward, which corresponds to the future effect described herein.

The solution will now be described with reference to various examples and embodiments and in terms of functionality in a "network agent" which may be implemented in the serving network node itself or in a "higher" node that could operate for multiple network nodes in the manner described herein. For example, the network agent could be implemented in a Mobility Management Entity, MME, associated with the wireless network, or as a function in a cloud-like environment having a huge amount of processing and storing resources, commonly referred to as "the cloud". The solution is thus not limited to any particular implementation of the network agent.

FIG. 1 illustrates schematically how a network agent may be used for applying an effect estimation function, in this case a Q-learning function, to achieve improved cell assignments for wireless devices in a wireless network. It is assumed that multiple "candidate" cells are available for cell assignment to the wireless devices, which cells may be served by one or more network nodes. The network agent obtains various "observations" from an environment in the network which is basically comprised of said cells, network nodes and wireless devices. These observations may include cell configurations, traffic load in the different cells, various measurements performed by the wireless devices (denoted UE measurements) and/or by the network nodes, information about UE classes and capabilities of the wireless devices present in the cells, various statistics of performance in the cells, and so forth.

The obtained observations are fed as parameter values or the like into an input vector for an effect estimation function which may be a Q-learning function or some other machine learning function. The input vector thus basically reflects the current conditions in the network environment which information is useful for estimating a future effect of taking the action of assigning a wireless device to a candidate cell. The input vector is created for a specific wireless device and is applied to the effect estimation function which produces an estimated future effect of assigning that wireless device to each candidate cell. The Q-learning function or other machine learning function has thus the ability to use knowledge about how different conditions in the cells have affected the performance in the past, to predict the future effect of assigning the wireless device to either of the candidate cells.

The estimated future effects for a set of candidate cells can be compared so that the cell that provides the most favourable or "best" future effect can be selected to serve the wireless device. However, there may be other aspects to consider for the cell assignment, which are however outside the scope of this solution. The cell assignments are indicated in the figure as "actions" which will more or less affect the environment in the network. An "immediate" effect or reward resulting from a cell assignment, which could include an improvement or deterioration of one or more observed parameters, can also be used for updating the effect estimation function, as illustrated by a white arrow.

The effect estimation function can be trained over time based on an immediate effect resulting from each cell assignment which may be either based on the estimated future effects or made by arbitrarily assigning wireless devices to cells, and measuring the immediate effect in the wireless network for each arbitrary cell assignment. The effect estimation function can then be modified to produce an estimated future effect that takes into account the respective immediate effect. The effect estimation function or Q-learning function could for example be based on a neural network and the training may be done through so-called back-propagation which is a well-known procedure as such in this field.

An example of how a cell assignment could be accomplished by using the solution, will now be described with reference to FIG. 3, where a network agent 200 operates to find a suitable cell for a wireless device 202 which is currently connected to a serving network node 204 such as a base station or eNodeB, depending on the terminology used. It is assumed that the serving network node 204 is able to communicate in a set of candidate cells such that one of them can be selected for cell assignment so as to serve the wireless device 202.

A first operation 2:1A illustrates that the wireless device 202 performs measurements on signals transmitted from the serving network node 204 and from other neighbouring network nodes 206 of which only one is shown for simplicity. Another operation 2:1B further illustrates that the network node 204 may likewise perform measurements on signals transmitted from the wireless device 202. These measurements may include measurements of Reference Signal Received Power, RSRP, although the solution is not limited thereto. The signal measurements are reported to the network agent 200, as illustrated in operation 2:2. Measurement reports from the device 202 may be communicated to the network agent 200 via the serving network node 204 and possibly also over other nodes in the network. Also the neighbouring nodes 206 may perform and report various signal measurements, not shown.

Another operation 2:3 illustrates that the network agent 200 evaluates the available candidate cells for cell assignment of the wireless device 202. This evaluation is basically done by creating an input vector based on the obtained measurements, applying the input vector to a previously generated and trained Q-learning function, and selecting a candidate cell to serve the wireless device, based on estimated future effects of the candidate cells which are the outcome from the Q-learning function. This evaluation will be described in more detail later below.

A final operation 2:4 illustrates that the network agent 200 basically assigns the wireless device 202 to the selected cell, which may be the most favourable cell in the set of candidate cells by having the best estimated future effect as found in operation 2:3. As mentioned above, other considerations may also be made for the cell assignment that may result in selection of another cell, which is however outside the procedure described herein.

An example of how the solution may be employed in terms of actions which may be performed by a network agent such as the network agent 200, is illustrated by the flow chart in FIG. 3, which will now be described with further reference to FIG. 2 although this procedure is not limited to the example of FIG. 2. The actions in FIG. 3 could thus be performed by the network agent 200 or any other similar entity, for providing cell assignment for a wireless device 202 served by a network node 204 in a wireless network. The network agent 200 may, without limitation, be implemented in any of the serving network node 204, an MME associated with the wireless network, and the cloud.

A first action 300 illustrates that measurements, made by at least one of the wireless device 202 and the network node 204, are obtained, which measurements are related to network performance and to signals transmitted in one or more cells. The measurements may include RSRP measurements, as an illustrative but non-limiting example.

In a next action 302, an input vector for an effect estimation function is created for a set of candidate cells served by the network node 204, based on the obtained measurements. Other information, e.g. related to configuration of the network node 204 and/or conditions in the candidate cells, may also be used as a basis for the input vector which thus basically reflects the current environment, as also described above. It may be said that the input vector is "device-specific" by being valid for this particular wireless device 202.

In a further action 304, a future effect of assigning the wireless device 202 to a candidate cell is estimated for each cell in the set of candidate cells, by applying the created device-specific input vector to the effect estimation function. The output from the effect estimation function is thus comprised of a set of predicted future effects related to the set of candidate cells, which can be compared in order to select one of the candidate cells for assignment of the wireless device 202 thereto. Some examples of how this can be done will be described later below.

Another action 306 illustrates that a cell in the set of candidate cells determined, i.e. selected, to serve the wireless device, based on the estimated future effects of the candidate cells, and the wireless device 202 is assigned to the determined cell for use in radio communication with the wireless device 202, in a following action 308. In the latter action, the network agent 200 may instruct or otherwise trigger the serving network node 204 to implement the cell assignment of the cell determined in action 306, which could be made by means of some suitable procedure which is not necessary to describe herein as such. Two more optional actions in FIG. 3 will be described below.

Some further examples of embodiments that may be employed in the above procedure in FIG. 3 will now be described. In some example embodiments, the input vector created in action 302 may comprise information related to one or more of: the number of device categories per cell, throughput statistics per device category per cell, total throughput per cell, traffic load per cell, and statistics on delay, round-trip time and/or packet loss per cell. At least some of the above information is closely related to performance which has impact on the future effects that are estimated by the effect estimation function in action 304. In another example embodiment, the input vector may be created further based on configurations of the serving network node and/or the candidate cells.

Further example embodiments may be that a measured immediate effect resulting from assigning the wireless device 202 to the determined cell is obtained, as illustrated by an action 310, and the effect estimation function is updated, as illustrated by another action 312, to produce an estimated future effect that depends on the obtained immediate effect. The term "immediate effect" basically refers to measurements of various performance-related parameters as follows. In some example embodiments, the measured immediate effect may be obtained based on one or more of: throughput, buffer size in the wireless device, buffer size in the network node, round-trip time, amount of retransmissions, a Channel Quality Indicator, CQI, reported by the wireless device, and block error rate. The immediate effect thus basically reflects how the environment has changed, e.g. improved or deteriorated, as a result from the cell assignment made in action 308.

In further example embodiments, the measured immediate effect may be obtained further based on any of: application usage in the wireless device, priority of the used application, and a signalling cost for moving the wireless device 202 from one cell to another. The signalling cost thus refers to how much added signalling over radio is required for changing a current cell assignment for the device if necessary to assign the device to the determined candidate cell.

In another example embodiment, determining a cell in the set of candidate cells to serve the wireless device may comprise comparing the estimated future effects of the candidate cells in the set and selecting the cell in the set that provides the most favourable future effect. An example of how this embodiment can be employed will be described later below with reference to FIG. 4.

In further example embodiments, the effect estimation function is trained by arbitrarily assigning wireless devices to cells, measuring the immediate effect in the wireless network for each arbitrary cell assignment and modifying the effect estimation function to produce an estimated future effect that takes into account the respective immediate effect.

In another example embodiment, the effect estimation function may be a Q-learning function, which has also been mentioned above. In this case, another example embodiment may be that the Q-learning function is related to a neural network, such as a so-called deep neural network. The principles of creating and using a neural network or deep neural network for the purpose of reinforcement learning, i.e. updating the Q-learning function, are known as such and will therefore not be described herein in any detail.

In further example embodiments, the above-described procedure may be performed by a network agent 200 implemented in either of: the serving network node, a Mobility Management Entity, MME, associated with the wireless network, and a cloud environment.

A more detailed example of how the evaluation of the candidate cells for a wireless device may be done will now be described with reference to the flow chart in FIG. 4 which corresponds to actions 302-308 in FIG. 3. The actions in FIG. 4 may be performed by the above-described network agent 200 and the terminology used when describing FIG. 3 will also be used below when describing FIG. 4. It was mentioned above that the candidate cells may be evaluated one by one in a succession of operations, or they may be evaluated at the same time in operations executed in parallel. The procedure in FIG. 4 illustrates that they are basically evaluated in sequence but this procedure could be modified for use in a parallel fashion as well.

It is assumed that at least some performance measurements related to the wireless device 202 have been obtained prior to this procedure. A first action 400 illustrates that an input vector for a Q-learning function of effect estimation is created for the set of candidate cells, at least based on the obtained measurements and possibly also based on other information related to node and cell configuration(s), which corresponds to action 302. The created input vector is thus valid for the wireless device 202. The input vector is then applied to the Q-learning function to produce estimated future effects of assigning the wireless device 202 to either of the candidate cells, in another action 402 which corresponds to action 304. The actual evaluation of the cells can then be performed as follows. It should be noted that the term "candidate cell" is used to indicate that it is available and subjected to evaluation for cell assignment of the wireless device 202.

In a next action 404, a candidate cell in the set of candidate cells is identified and selected for evaluation. An estimated future effect for the chosen candidate cell is then obtained according to the Q-learning function, in another action 406. It is then checked in an action 408 if all the cells in the set of candidate cells have been evaluated yet. If not, the procedure returns to action 404 for evaluating a next cell in the set of candidate cells and action 406 is also executed for the next cell. Actions 404-408 are repeated until it is found in action 408 that all cells in the set of candidate cells have been evaluated and an estimated future effect has been obtained for all candidate cells.

Having obtained estimated future effects for all candidate cells of interest, another action 410 illustrates that the estimated future effects of the candidate cells are compared, basically to identify which cell is the best one, i.e. by providing the most favourable future effect. The cell that provides the most favourable future effect is then selected in a following action 412 and the wireless device 202 is assigned to the selected cell in a final action 414.

Figure 5:
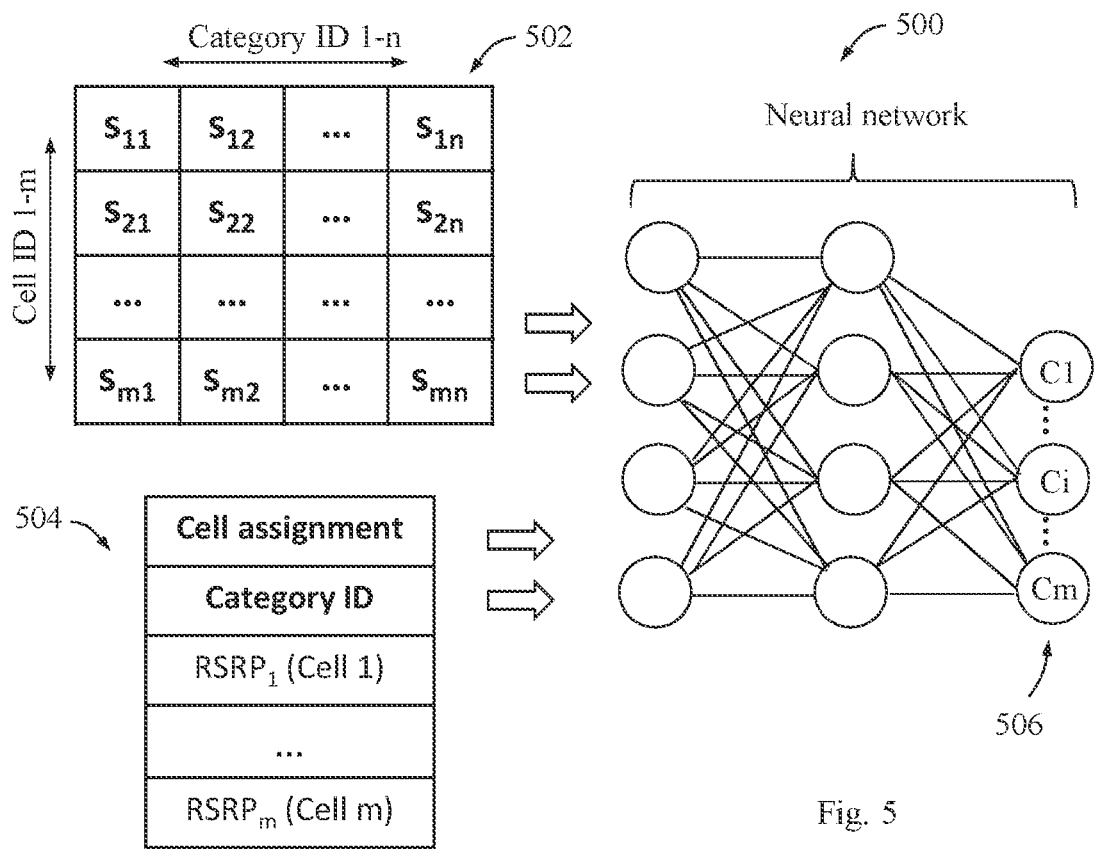
FIG. 5 is a schematic diagram illustrating how a deep neural network can be employed by applying information to a Q-learning function, according to further example embodiments.

An example of how an effect estimation function such as a Q-learning function may be employed for cell assignment of a wireless device will now be described in more detail with reference to FIG. 5 where 500 denotes a neural network generated by means of a Q-learning function, which is able to produce a basis for cell assignment in the manner described herein. The same terminology as in the previous figures will be used again in the following. 502 and 504 denotes various information that are used for creating the input vector for the Q-learning function as follows.

A matrix 502 contains information about how many wireless devices of specific device categories, "Category ID 1-$n$", are currently assigned to different cells "Cell ID 1-$m$". The Cell IDs may identify each cell in a set of candidate cells being served by one or more specific network nodes. Some examples of device category may include Internet of Things, IoT, device, smart phone version x, tablet model y, etc., which are identified by the Category IDs. For example, $S_{12}$ devices of category ID2 are currently assigned to the cell with cell ID1, $S_{21}$ devices of category ID1 are currently assigned to the cell with cell ID2, and so forth. The information in matrix 502 is used as a basis for creating the input vector for the Q-learning function. Adding statistics on throughput per device category per cell would transform the matrix 502 into a three-dimensional tensor, which is another optional example of how the solution could be employed.

A table 504 contains information about measurements related to a specific wireless device 202 including its current cell assignment to a cell, if any, and a device category ID. The table 504 in this example further contains measurements of reference signals, RSRP in different cells as measured and reported by the wireless device 202 in the manner described above. Thus, the wireless device 202 has measured and reported $RSRP_1$ in cell 1, . . . and RSRPm in cell m.

The current cell assignments in matrix 502 and the device measurements in table 504 are used as input to the neural network as indicated by the white arrows, and the resulting outcome from the neural network is comprised of estimated future effects 506 for the candidate cells C1 . . . Ci . . . Cm.

Some further details and considerations of the above examples and embodiments will now be described.

Conventional cell assignment is, as discussed above, relatively static and not always optimal in terms of network resource usage and device performance. The examples and embodiments described herein basically use reinforcement learning where the network agent 200 learns how to best match wireless devices to cells.

When utilizing reinforcement learning for cell assignment as illustrated in FIG. 1, the network agent observes and learns how to affect the environment to maximize the effect or reward of cell assignments over time.

The effect or reward as discussed herein could be a function of one or more of data throughput, device buffer sizes and device related measurements such as the amount of retransmissions or the RSRP which may be indicated in a Channel Quality Indicator, C01, reported from the wireless device.

The environment is typically comprised of a network node and a set of wireless devices. The procedure described herein may also be applied for several network node to enable handover of a wireless device. The observations relate to e.g. device measurement reports and network node configurations, while the actions correspond to reassigning, or moving, one or several wireless devices from one cell to another.

A Q-learning function can thus be used to estimate future maximum effects for each possible action of cell assignment. In FIG. 5, the input information is related to the network node configuration and a specific wireless device, while the output from the neural network is the estimated maximum future reward for each possible immediate action of cell assignment. It is also possible to use multiple wireless devices as input state, and also aggregate network node measurements such as load in each cell or similar. The neural network can be trained by observing the environment, taking actions, and calculating immediate rewards.

The above-described input vector for the effect estimation function, used by the reinforcement algorithm, reflects at least partly the current state in the network, and also contains information about a particular wireless device, which may be extracted from Radio Resource Control, RRC, device capability information.

Information related to the serving network node 204 may include, but is not limited to:
  Number of allocated device categories per cell.
  Statistics on throughput per device category per cell.
  Total throughput per cell.
  Load per cell.
  Statistics related to delay, round-trip time, and packet loss per cell.

Information related to the wireless device 204 could for example be extracted from the RRC device Capability Information, which is typically signaled from the wireless device during the attach procedure, and other sources such as the network node 204. This information may include, but is not limited to:
  Current cell assignment (from network node).
  Category type (from wireless device).
  Supported bands (from wireless device).
  List of RSRP values, for the assigned cell and a number of neighbor cells (from wireless device).
  Statistics on data throughput, block-error rate, packet loss, round-trip time.
  Priority for ongoing activity (e.g. emergency calls).

Figure 6:
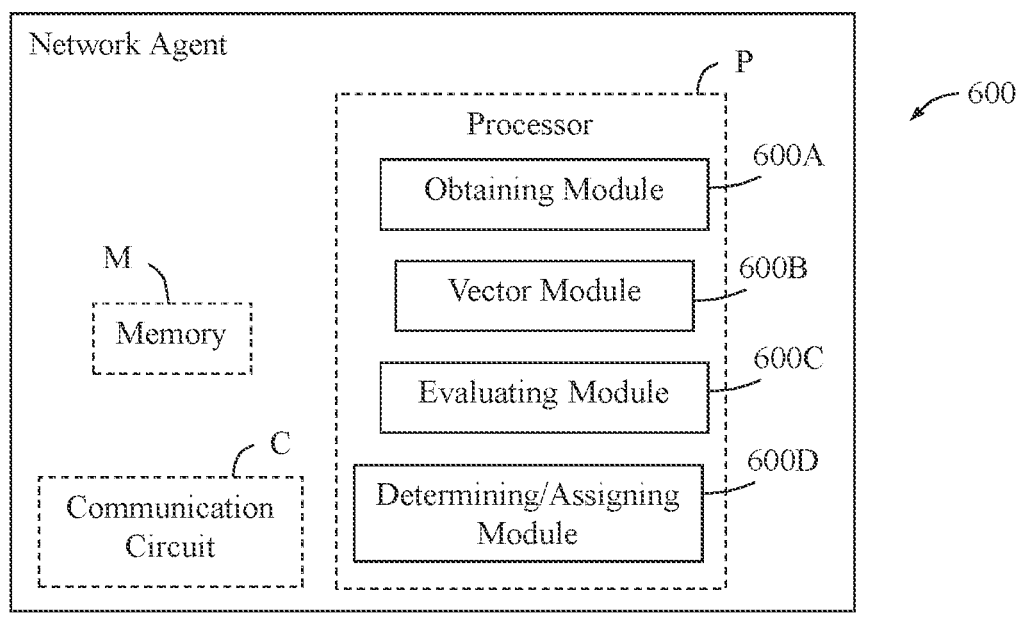
FIG. 6 is a block diagram illustrating how a network agent may be structured, according to further example embodiments.

The block diagram in FIG. 6 illustrates a detailed but non-limiting example of how a network agent 600 may be structured to bring about the above-described solution and embodiments thereof. The network agent 600 may be configured to operate according to any of the examples and embodiments for employing the solution as described herein, where appropriate and as follows. The network agent 600 is shown to comprise a processor P and a memory M, said memory comprising instructions executable by said processor whereby the network agent 600 is operable as described herein. The network agent 600 also comprises a communication circuit C with suitable equipment for communicating in the manner described herein.

Figure 2:
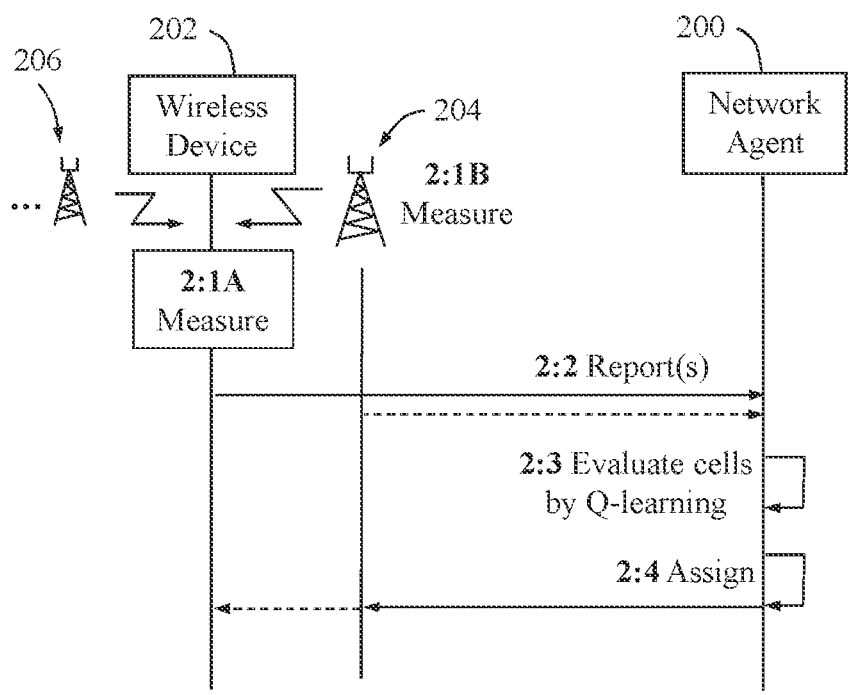
FIG. 2 is a signaling diagram illustrating a simplified procedure when the solution is used, according to further example embodiments.

The network agent 600 corresponds to the network agent 200 in FIG. 2. The communication circuit C may be configured for communication with a wireless device corresponding to the wireless device 202 in FIG. 2 or with a network node corresponding to the serving network node 204 in FIG. 2, using suitable protocols and messages. Such communication may be performed over any suitable links depending on the implementation, and the solution and embodiments herein are not limited to using any specific types of messages or protocols for communication.

Figure 3:
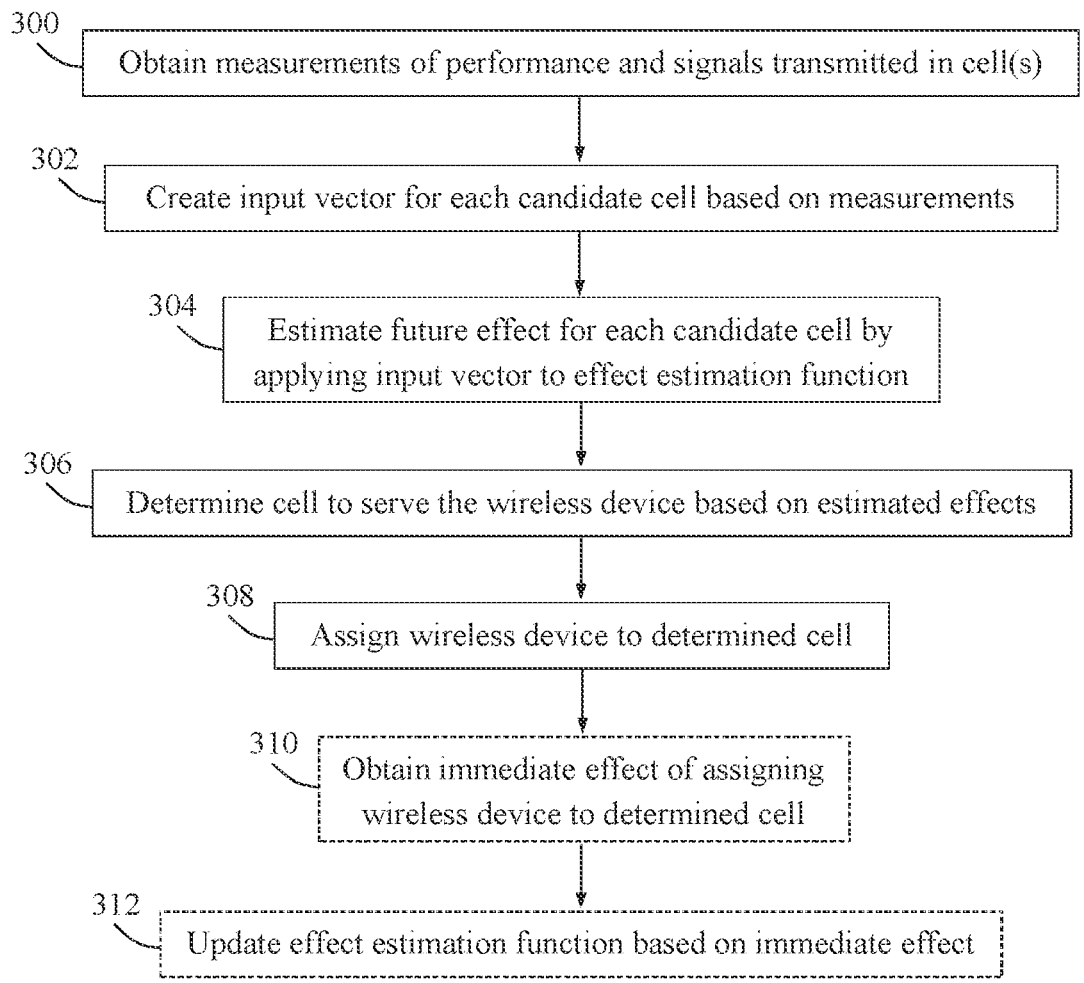
FIG. 3 is a flow chart illustrating a procedure that may be performed by a network agent, according to further example embodiments.
Figure 4:
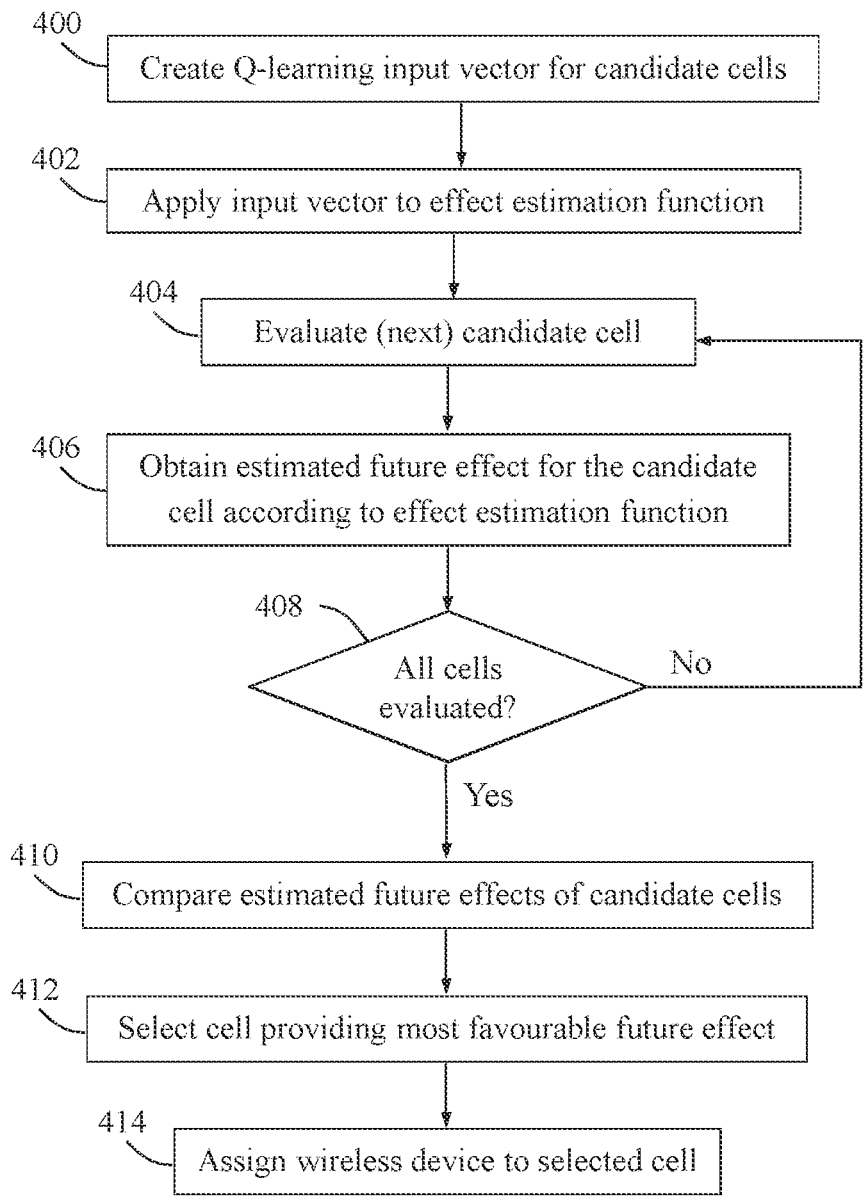
FIG. 4 is a flow chart illustrating an example of how a network agent may operate in more detail, according to further example embodiments.

The network agent 600 comprises means configured or arranged to basically perform at least some of the actions in FIGS. 3 and 4, and more or less as described above for the network agent 200 in various examples and embodiments. In FIG. 6, the network agent 600 is arranged or configured to provide cell assignment for a wireless device served by a network node in a wireless network, as follows.

The network agent 600 is configured to obtain measurements, made by at least one of the wireless device and the network node, related to network performance and to signals transmitted in one or more cells. This operation may be performed by an obtaining module 600A in the network agent 600, e.g. in the manner described above for action 300. The obtaining module 600A could alternatively be named a receiving module or observation module.

The network agent 600 is further configured to create, for a set of candidate cells served by the network node, an input vector for an effect estimation function based on the obtained measurements. This operation may be performed by a vector module 600B in the network agent 600, e.g. as described above for action 302. The vector module 600B could alternatively be named a creating module or configuring module.

The network agent 600 is also configured to estimate, for each candidate cell, a future effect of assigning the wireless device to said candidate cell by applying the created input vector to the effect estimation function. This operation may be performed by an evaluating module 600C in the network agent 600, basically as described above for action 304.

The network agent 600 is further configured to determine a cell in the set of candidate cells to serve the wireless device, based on the estimated future effects of the candidate cells. This operation may be performed by a determining module 600D in the network agent 600, e.g. in the manner described above for action 306. The determining module 600D could alternatively be named a decision module or assigning module. The network agent 600 is also configured to assign the wireless device to the determined cell for use in radio communication with the wireless device, as described above for action 308, which may be performed by the determining module 600D.

It should be noted that FIG. 6 illustrates various functional modules or units in the network agent 600, and the skilled person is able to implement these functional modules in practice using suitable software and hardware. Thus, the solution is generally not limited to the shown structures of the network agent 600, and the functional modules or units 600A-D therein may be configured to operate according to any of the features and embodiments described in this disclosure, where appropriate.

The functional modules or units 600A-D described above could thus be implemented in the network agent 600 by means of hardware and program modules of a computer program comprising code means which, when run by the processor P causes the network agent 600 to perform at least some of the above-described actions and procedures.

In FIG. 6, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the network agent 600 in the form of a memory having a computer readable medium and being connected to the processor P. The computer program product or memory in the network agent 600 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the network agent 600.

The solution described herein may thus be implemented in the network agent 600 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

While the solution has been described with reference to specific exemplifying embodiments, the description is generally only intended to illustrate the inventive concept and should not be taken as limiting the scope of the solution. For example, the terms "wireless device", "network agent", "cell", "network node", "candidate cell", "input vector", "effect estimation function", "Q-learning function", "effect" and "device category" have been used throughout this disclosure, although any other corresponding entities, functions, and/or parameters could also be used having the features and characteristics described here. The solution is defined by the appended claims.

The invention claimed is:

1. A method of providing cell assignment for a wireless device served by a network node in a wireless network, the method comprising:
   obtaining measurements, made by at least one of the wireless device and the network node, related to network performance and to signals transmitted in one or more cells:
   creating, for a set of candidate cells served by the network node, an input vector for an effect estimation function based on the obtained measurements, wherein the input vector comprises information related to one or more of: the number of device categories per cell and throughput statistics per device category per cell:
   estimating, for each candidate cell, a future effect of assigning the wireless device to said candidate cell by applying the created input vector to the effect estimation function, wherein the effect estimation function is trained by arbitrarily assigning wireless devices to cells, measuring the immediate effect in the wireless network for each arbitrary cell assignment and modifying the effect estimation function to produce an estimated future effect that takes into account the respective immediate effect;
   determining a cell in the set of candidate cells to serve the wireless device, based on the estimated future effects of the candidate cells: and
   assigning the wireless device to the determined cell for use in radio communication with the wireless device.

2. A method according to claim 1, wherein the input vector further comprises information related to one or more of: total throughput per cell, traffic load per cell, and statistics on delay, round-trip time and/or packet loss per cell.

3. A method according to claim 1, wherein the input vector is created further based on configurations of the serving network node and/or the candidate cells.

4. A method according to claim 1, wherein a measured immediate effect resulting from assigning the wireless device to the determined cell is obtained and the effect estimation function is updated to produce an estimated future effect that depends on the obtained immediate effect.

5. A method according to claim 4, wherein the measured immediate effect is obtained based on one or more of: throughput, buffer size in the wireless device, buffer size in the network node, round-trip time, amount of retransmissions, a Channel Quality Indicator, CQI, reported by the wireless device, and block error rate.

6. A method according to claim 4, wherein the measured immediate effect is obtained further based on any of: application usage in the wireless device, priority of the used application, and a signalling cost for moving the wireless device from one cell to another.

7. A method according to claim 1, wherein determining a cell in the set of candidate cells to serve the wireless device comprises comparing the estimated future effects of the candidate cells in the set and selecting the cell in the set that provides the most favourable future effect.

8. A method according to claim 1, wherein the effect estimation function is a Q-learning function.

9. A method according to claim 8, wherein the Q-learning function is related to a neural network.

10. A method according to claim 1, wherein the method is performed by a network agent implemented in either of: the serving network node, a Mobility Management Entity, MME, associated with the wireless network, and a cloud environment.

11. A method according to claim 1, wherein the device categories comprise device type and/or device version of the wireless device.

12. A method according to claim 11, wherein the device type comprises one or more of: Internet of Things, IoT, device, smart phone, tablet, laptop computer, and Machine-to-Machine, M2M, device, wherein the device version comprises the version of the wireless device.

13. A network agent arranged to provide cell assignment for a wireless device served by a network node in a wireless network, wherein the network agent is configured to:
obtain measurements, made by at least one of the wireless device and the network node, related to network performance and to signals transmitted in one or more cells;
create, for a set of candidate cells served by the network node, an input vector for an effect estimation function based on the obtained measurements, wherein the input vector comprises information related to one or more of: the number of device categories per cell and throughput statistics per device category per cell;
estimate, for each candidate cell, a future effect of assigning the wireless device to said candidate cell by applying the created input vector to the effect estimation function, wherein the network agent effect is configured to train the effect estimation function by arbitrarily assigning wireless devices to cells, measuring the immediate effect in the wireless network for each arbitrary cell assignment and modifying the effect estimation function to produce an estimated future effect that takes into account the respective immediate effect;
determine a cell in the set of candidate cells to serve the wireless device, based on the estimated future effects of the candidate cells; and
assign the wireless device to the determined cell for use in radio communication with the wireless device.

14. A network agent according to claim 13, wherein the input vector further comprises information related to one or more of: total throughput per cell, traffic load per cell, and statistics on delay, round-trip time and/or packet loss per cell.

15. A network agent according to claim 13, wherein the network agent is configured to create the input vector further based on configurations of the serving network node and/or the candidate cells.

16. A network agent according to claim 13, wherein the network agent is configured to obtain a measured immediate effect resulting from assigning the wireless device to the determined cell, and to update the effect estimation function to produce an estimated future effect that depends on the obtained immediate effect.

17. A network agent according to claim 16, wherein the network agent is configured to obtain the measured immediate effect based on one or more of: throughput, buffer size in the wireless device, buffer size in the network node, round-trip time, amount of retransmissions, a Channel Quality Indicator, CQI, reported by the wireless device, and block error rate.

18. A network agent according to claim 16, wherein the network agent is configured to obtain the measured immediate effect further based on any of: application usage in the wireless device, priority of the used application, and a signalling cost for moving the wireless device from one cell to another.

19. A network agent according to claim 13, wherein the network agent is configured to determine a cell in the set of candidate cells to serve the wireless device by comparing the estimated future effects of the candidate cells in the set and selecting the cell in the set that provides the most favourable future effect.

20. A network agent according to claim 13, wherein the effect estimation function is a Q-learning function.

21. A network agent according to claim 20, wherein the Q-learning function is related to a neural network.

22. A computer program product comprising a non-transitory medium storing instructions to configure at least one processor to perform operations comprising:
obtaining measurements, made by at least one of the wireless device and the network node, related to network performance and to signals transmitted in one or more cells;
creating, for a set of candidate cells served by the network node, an input vector for an effect estimation function based on the obtained measurements, wherein the input vector comprises information related to one or more of: the number of device categories per cell and throughput statistics per device category per cell;
estimating, for each candidate cell, a future effect of assigning the wireless device to said candidate cell by applying the created input vector to the effect estimation function, wherein the effect estimation function is trained by arbitrarily assigning wireless devices to cells, measuring the immediate effect in the wireless network for each arbitrary cell assignment and modifying the effect estimation function to produce an estimated future effect that takes into account the respective immediate effect;

determining a cell in the set of candidate cells to serve the wireless device, based on the estimated future effects of the candidate cells; and assigning the wireless device to the determined cell for use in radio communication with the wireless device.

\* \* \* \* \*